United States Patent Office 3,030,362
Patented Apr. 17, 1962

3,030,362
SUBSTITUTED OXADIAZINES AND
DIOXAZINES
David C. England, Wilmington, Del., assignor to E. I. du
Pont de Nemours and Company, Wilmington, Del., a
corporation of Delaware
No Drawing. Filed Dec. 24, 1958, Ser. No. 782,619
17 Claims. (Cl. 260—244)

This invention relates to a new class of heterocyclic compounds and more particularly to a new class of polyfluoro-substituted monospirooxadiazines and dispirodioxazines. It has as its principal objects provision of these novel compounds and of methods for their preparation.

Only a small amount of work has been reported on the 1,3,5,2H-oxadiazines and even less on the 1,3,5,2H,4H-dioxazines. There has been no report of any such mono- or dispirocyclobutane-substituted compounds nor of polyfluorinated such structures. Furthermore, the synthesis routes for the monocyclic dioxazines and oxadiazines thus far known are either quite difficult chemically or else involve the chemistry of natural products and, in any event, are not particularly efficient and certainly not of high yields or conversions.

A new class of polyfluoromonospiro-1,3,5,2H-oxadiazines and polyfluorodispiro-1,3,5,2H,4H-dioxazines has now been discovered which can be readily obtained by direct single-step reactions between nitriles and 2,2-dihalo-3,3,4,4-tetrafluorocyclobutanones. These new monospirooxadiazines and dispirodioxazines are, generically, quite stable chemically and physically and have generic utility in those areas of industry where high temperature and chemical stability are required, such as in high-temperature heat transfer systems, power transmission means useful at high temperatures, and the like.

More specifically, these new products can be characterized as 2,2-($\alpha,\alpha$-dihalo-$\beta,\beta,\gamma,\gamma$-tetrafluoro-$\alpha,\gamma$-trimethylene)-1,3,5,2H-oxadiazines and 2,2-4,4-bis($\alpha,\alpha$-dihalo-$\beta$, $\beta,\gamma,\gamma$-tetrafluoro - $\alpha,\gamma$ - trimethylene)-1,3,5,2H,4H-dioxazines. These compounds can be represented by the following structural formulas:

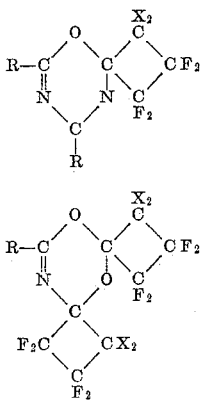

wherein the R's, alike or different, are used to represent hydrogen or monovalent organic radicals free from aliphatic unsaturation, i.e., aliphatically saturated, and therefore inclusive of alkyl, aryl, alkaryl, aralkyl, and cycloalkyl radicals, preferably also free of Zerewitinoff active hydrogen and most preferably solely hydrocarbon of no more than eight carbons each; the X's, which can be alike or different, are used to represent halogen of atomic number from 9–35, and for reasons of greater availability of the necessary intermediates, preferably of atomic number 9–17, i.e., fluorine or chlorine.

These products can be named several ways. Thus, to stress the parent oxadiazine and dioxazine structures as the major similarity between the mono- and dispiro compounds, they can be named, as has been done in the foregoing, as $\alpha,\alpha$-dihalo-$\beta,\beta,\gamma,\gamma$-tetrafluoro-$\alpha,\gamma$-trimethylene substituted oxadiazines and bis($\alpha,\alpha$-dihalo-$\beta,\beta,\gamma,\gamma$-tetrafluoro-$\alpha,\gamma$-trimethylene-substituted)dioxazines. The monospiro compounds, i.e., the oxadiazines, would preferably be named and indexed by Chemical Abstracts, and also by the I.U.P.A.C.—see, for instance, Rule A–41 of the tentative rules for organic nomenclature reported on at Zurich July 20–28, 1955, as suitably substituted oxadiazaspiro[3.5]nona-6,8-dienes, i.e., as 1,1-dihalo-2,2, 3,3-tetrafluoro-5,7,9 - oxadiazaspiro[3.5]nona-6,8-dienes. The dispiro compounds, i.e., the dioxazines, it is believed, are most unequivocally named in accordance with Section .7 of the aforesaid Rule A–41, using the prime and double prime nomenclature with respect to the second and third ring structures. Thus, the dispiro compounds would be properly described as 2,2-dihalo-3,3,4,4-tetrafluorocyclobutane-1-spiro - 2'-1',5',2'H,4'H - dioxazine-4'-spiro-1'',2'',2''-dihalo - 3'',3'',4'',4'' - tetrafluorocyclobutanes.

These new polyfluoromonospirooxadiazines and dispirodioxazines can be prepared readily by the direct cycloaddition of, respectively, one and two molar proportions of the requisite 2,2-dihalo-3,3,4,4-tetrafluorocyclobutanone and, again respectively, two and one molar proportions of the requisite nitrile. Depending on the stoichiometry and the relative reactivity of the ketone and nitrile reactants, mixtures of the two types of products will be obtained. This is particularly true in the case of the aromatic and alkaromatic nitriles. The reaction involves cycloaddition in each instance between the requisite one or two molecules of nitrile and, respectively, two or one molecules of the 2,2,-dihalo-3,3,4,4-tetrafluorocyclobutanones involving the carbonyl double bond of the ketones and the nitrile triple bond of the nitriles.

The monospiro products, i.e., the oxadiazines, will have as substituents on the 4- and 6-carbons of the 1,3,5,2H, 4H-oxadiazine ring the organic radicals, if any, which together with the carbonitrile (C≡N) group from the entire molecule of the nitrile coreactant. In the case of the dispiro products, i.e., the dioxazines, the same respective substituent, if any, will be present only on the 6-carbon of the 1,3,5,2H,4H-dioxazine ring. In all instances the substituents on the 2-carbon of the 1,3,5,2H-oxadiazine ring in the case of the monospiro products, and on the 2- and 4-carbons of the 1,3,5,2H,4H-dioxazine ring in the case of the dispiro products, will be the $\alpha,\alpha$-dihalo-$\beta,\beta,\gamma,\gamma$-tetrafluorotrimethylene diradical which, together with the ring carbonyl, forms the entire molecule of the 2,2-dihalo-3,3,4,4-tetrafluorocyclobutanone coreactant.

These various reaction sequences are illustrated by the following structural formulas in which the R's and X's are as previously indicated:

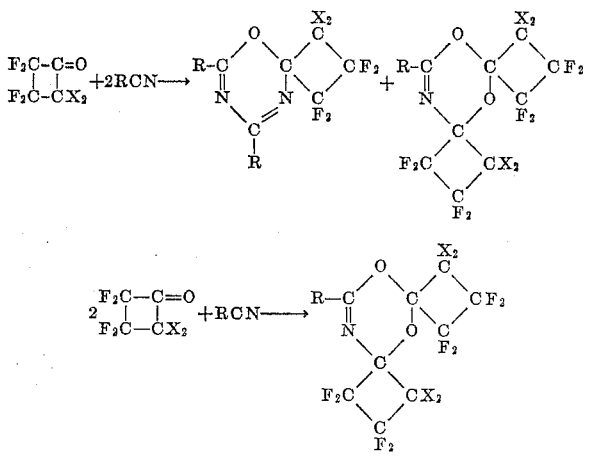

The new polyfluoromoospiro-1,3,5,2H-oxadiazines and dispiro-1,3,5,2H,4H-dioxazines of this invention, and the preparation thereof, are illustrated in greater detail, but are not to be limited by the following more specific examples in which the parts given are by weight.

EXAMPLE I

A glass reactor approximately 23 diameters long and of internal capacity corresponding to 150 parts of water was evacuated, cooled in a liquid nitrogen bath, and charged with 18 parts of perfluorocyclobutanone (preparable by the procedure of Example IV of my copending application S.N. 717,805) and 10.6 parts (an equimolar proportion based on the ketone) of benzonitrile. The reactor was sealed and then allowed to warm to room temperature. A two-phase mixture was obtained which remained immiscible after being heated overnight at steam bath temperatures with the ketone refluxing. Upon cooling in an ice/water bath, a crystalline material deposited. The sealed reactor was then reheated for another 24 hours at steam bath temperatures. At this point refluxing of the ketone had essentially stopped and the mixture was homogeneous at room temperature. After a final heating cycle of an additional 24 hours at steam bath temperatures, the reactor was cooled in a liquid nitrogen bath, opened, and the reaction mixture separated by distillation. There was recovered one part (about 5%) of perfluorocyclobutanone. The remaining reaction mixture was filtered and there was thus obtained 5.5 parts (15% of theory) of 1,1,2,2,3,3-hexafluoro-6,8-diphenyl-5,7,9-oxadiazaspiro[3.5]nona-6,8-diene as white crystals melting at 180° C. Yield 15% of theory. After recrystallization from ethanol, there was obtained five parts of the purified 2,4-diphenyl-1,3,5,2H-oxadiazine 6 - spiro - 1',2',2',3',3',4',4'-hexafluorocyclobutane. Nuclear magnetic resonance and infrared spectra were consistent with the hexafluorodiphenyloxadiazaspirononadiene structure.

*Analysis.*—Calcd. for $C_{18}H_{10}ON_2F_6$: C, 56.3%; H, 2.6%; N, 7.3%; F, 29.7%. Found: C, 56.6%; H, 2.8%; N, 7.3%; F, 29.3%.

Upon distillation of the filtrate there was obtained 15 parts (68.5% of theory) of 2,4-bis($\alpha,\gamma$-hexafluorotrimethylene)-6-phenyl-1,3,5,2H,4H-dioxazine as a clear, colorless liquid boiling at 101° C. under a pressure corresponding to 10 mm. of mercury; $n_D^{25}$, 1.4167. Nuclear magnetic resonance and infrared spectra were consistent with the 2,2,3,3,4,4-hexafluorocyclobutane-1-spiro-2'-4'-phenyl - 1',3' - 5',2'H,4'H - dioxazine-6'-spiro-1''-2'',2'',3'',3'',4'',4''-hexafluorocyclobutane structure.

*Analysis.*—Calcd. for $C_{15}H_5O_2NF_{12}$: C, 39.2%; H, 1.1%; N, 3.0%; F, 49.7%. Found: C, 39.8%; H, 1.4%; N, 3.3%; F, 49.1%.

EXAMPLE II

A mixture of 17 parts of perfluorocyclobutanone and eight parts (2.0 molar proportions based on the ketone) of acetonitrile was charged into a reactor as described in Example I. The sealed reactor and its contents were heated overnight at steam bath temperatures. The tube was then cooled, opened, and three parts (about 17.5%) of perfluorocyclobutanone was recovered by distillation. A small amount (0.65 part) of solid by-product was removed by filtration, and from the resultant filtrate, upon distillation, there was obtained 3.2 parts (20% of theory) of 4-methyl - 2,6 - bis($\alpha,\gamma$-hexafluorotrimethylene)-1,3,5,-2H,4H-dioxazine as a clear, colorless liquid boiling at 92° C. under a pressure corresponding to 95 mm. of mercury; $n_D^{25}$, 1.3412. The infrared and nuclear magnetic resonance spectra were consistent with the 2,2,3,3,-4,4-hexafluoro-1-spiro - 2'-4' - methyl-1',3',5',2'H,4'H-dioxazine - 6' - spiro-1''-2'',3'',3'',4'',4''-hexafluorocyclobutane structure.

*Analysis.*—Calcd. for $C_{10}H_3O_2NF_{12}$: N, 3.5%; F, 57.4%. Found: N, 3.6%; F, 56.5%.

EXAMPLE III

A reactor was charged as in Example I with a mixture of 25 parts of perfluorocyclobutanone and eight parts (an equimolar proportion based on the ketone) of propionitrile. The sealed reactor and the contents thereof were heated at steam bath temperatures for 250 hours. At the end of this time the mixture showed a small amount of white solid. Upon cooling and opening the tube, a trace of perfluorocyclobutanone was recovered on distillation. Distillation of the reaction mixture afforded 15.8 parts (55% of theory) of 4-ethyl-2,6-bis($\alpha,\gamma$ - hexafluorotrimethylene)-1,3,5,2H,4H-dioxazine as a clear, colorless liquid boiling at 115° C. under a pressure corresponding to 178 mm. of mercury; $n_D^{25}$, 1.3450. The nuclear magnetic resonance and infrared spectra were consistent with the 2,2,3,3,4,4-hexafluorocyclobutane - 1 - spiro-2'-4'-ethyl-1',3',5',2'H,4'H-dioxazine - 6' - spiro - 1'' - 2'',2'',3'',3'',4'',4''-hexafluorocyclobutane structure.

*Analysis.*—Calcd. for $C_{11}H_5O_2NF_{12}$: C, 32.1%; H, 1.2%; N, 3.4%; F, 55.5%. Found: C, 32.6%; H, 1.6%; N, 3.5%; F, 55.6%.

Continued distillation of the residue remaining from the isolation of the above-described dioxazine afforded 9.3 parts (31% of theory) of 1,1,2,2,3,3-hexafluoro-6,8-bis[1-(2',2',3',3',4',4' - hexafluoro-1'-hydroxycyclobutyl) ethyl]-5,7,9-oxadiazaspiro[3.5]nona-6,8-diene as a clear, colorless liquid boiling mostly at 160° C. under a pressure corresponding to 20 mm. of mercury; $n_D^{25}$, 1.3780. The product was syrupy as distilled and on standing partially crystallized. The infrared spectrum was in accord with the hexafluoro-bis[(hexafluorohydroxycyclobutyl) ethyl]oxadiazaspirononadiene structure.

*Analysis.*—Calcd. for $C_{18}H_{10}O_3N_2F_{18}$: N, 4.3%; F, 53.1%. Found: N, 4.2%; F, 52.7%.

EXAMPLE IV

A mixture of 12.0 parts of 2-bromo-2,3,3,4,4-pentafluorocyclobutanone and 5.4 parts (1.05 molar proportions based on the ketone) of benzonitrile in a glass reactor under anhydrous conditions was heated at a gentle reflux (pot temperature about 55–60° C.) for a period of three hours. At the end of this time the reaction mixture had solidified to a white crystalline mass. After being washed with n-hexane and dried there was thus obtained 7.6 parts (67% of theory) of crude 1-bromo-1,2,2,3,3-pentafluoro-6,8 - diphenyl - 5,7,9 - oxadiazaspiro[3.5]nona-6,8-diene as white crystals melting at 145–147° C. After recrystallization from n-hexane, the purified 2-($\alpha$-bromo-$\alpha,\beta,\beta,\gamma,\gamma$-pentafluorotrimethylene) - 4,6 - diphenyl-1,3,5, 2H-oxadiazine exhibited a melting point of 150–151° C. The infrared spectrum was consistent with the bromopentafluorodiphenyloxadiazaspirononadiene structure.

*Analysis.*—Calcd. for $C_{18}H_{10}BrF_5N_2O$: C, 48.6%; H, 2.3%. Found: C, 48.9%; H, 2.5%.

The 2-bromo-2,3,3,4,4-pentafluorocyclobutanone used as a starting material in this example may be prepared by the procedure of my copending application S.N. 717,805, as follows:

A. *Preparation of 2-Bromo-1,2,3,3,4,4-Hexafluoro-1-Methoxycyclobutane*

A stainless steel high-pressure reaction vessel of an internal capacity corresponding to 500 parts of water was charged with a mixture of 161 parts of bromotrifluoroethylene, 112 parts of methyl trifluorovinyl ether, one part of phenothiazine inhibitor, and about 0.3 part of a commercially available terpene stabilizer (see U.S. Patent 2,407,405). The reactor was sealed and heated at 175° C. for twelve hours. The reactor was then cooled to room temperature, vented to the atmosphere, and the reaction mixture separated by distillation. There was thus obtained 143 parts (52% of theory) of 2-bromo-1,2,3,3,4,4-hexafluoro-1-methoxycyclobutane as a clear, colorless liquid boiling at 101–110° C. contaminated with a small amount of unreacted bromotrifluoroethylene (B.P. 94° C.). The infrared spectrum was wholly consistent with the bromohexafluoromethoxycyclobutane structure.

*Analysis.*—Calcd. for $C_5H_3BrF_6O$: C, 26.4%; H, 1.1%. Found: C, 25.9%; H, 1.6%.

B. *Preparation of 2-Bromo-2,3,3,4,4-Pentafluorocyclobutanone*

A pressure-resistant reaction vessel fabricated from a commercially available alloy of nickel, iron, and molybdenum and of internal capacity corresponding to 500 parts of water was charged with a mixture of 143 parts of the above 2-bromo-1,2,3,3,4,4-hexafluoro-1-methoxycyclobutane, about 400 parts of sulfuric acid, and 12 parts of water. The reactor was closed and heated at 125° C. for twelve hours. The reactor and its contents were then cooled in a solid carbon dioxide/acetone bath. The reactor was opened and 500 parts of phosphorus pentoxide was added and the product removed by distillation. There was thus obtained 53 parts (42% of theory) of 2-bromo-2,3,3,4,4-pentafluorocyclobutanone as a clear, colorless liquid boiling at 52.0–54.5° C. at atmospheric pressure. The infrared and nuclear magnetic resonance spectra were wholly consistent with the bromopentafluorocyclobutanone structure.

*Analysis.*—Calcd. for $C_4BrF_5O$: C, 20.1%; F, 39.8%. Found: C, 20.4%; F, 40.4%.

EXAMPLE V

A mixture of 10.3 parts of benzonitrile and 21.1 parts (an equimolar proportion based on the nitrile) of 2,2-dichloro-3,3,4,4-tetrafluorocyclobutanone (preparable by the procedure of Example IX of my copending application S.N. 717,805) was heated in a glass reactor under anhydrous conditions at a gentle reflux (pot temperature about 70° C.). After about 20 hours under these conditions, the reaction mixture had solidified. After being washed with benzene and dried there was thus obtained 20.4 parts (98% of theory) of 1,1-dichloro-2,2,3,3-tetrafluoro-6,8-diphenyl-5,7,9-oxadiazaspiro[3.5]nona-6,8-diene as white crystals melting at 184–185° C. The infrared spectrum was consistent with the dichlorotetrafluorodiphenyloxadiazaspirononadiene structure.

*Analysis.*—Calcd. for $C_{18}H_{10}Cl_2F_4N_2O$: C, 51.1%; H, 2.4%; N, 6.5%. Found: C, 51.0%; H, 2.4%; N, 6.8%.

EXAMPLE VI

A cylindrical glass reactor was charged with 38 parts of perfluorocyclobutanone and 8.4 parts (0.33 molar proportion based on the ketone) of phenylacetonitrile and the reactor sealed, all as described in Example I. The resultant immiscible liquid reaction mixture was heated in the sealed reactor for 90 hours at steam bath temperatures with no apparent reaction. The reactor was then heated at 175° C. for 12 hours, at the end of which time the reaction mixture was homogeneous when warm. A crystalline solid separated as the reactor cooled to room temperature. The reactor was then opened and there was recovered therefrom 17 parts (44.7% recovery) of unreacted perfluorocyclobutanone. The solid residue was recrystallized from n-hexane and there was thus obtained 9.5 parts of mixed products melting over the range 119–147° C. Upon a further recrystallization from n-hexane two categorically different crystalline forms were noted, one in needle form and the other in rhomboid form. These two crystalline materials were separated mechanically. From 5.7 parts of the mixture there was obtained 1.8 parts of the needle product melting at 128–130° C. and 3.4 parts of rhomboid product melting at 160–162° C. After two more recrystallizations from n-hexane, the needle product was found to exhibit a melting point of 129–130° C. and to be much less soluble than the rhomboid product. The needle product was characterized as α(2,2,3,3,4,4-hexafluoro-1-hydroxycyclobutyl)phenylacetonitrile as disclosed and claimed in my copending application Serial Number 803,580, filed April 2, 1959.

*Analysis.*—Calcd. for $C_{12}H_7F_6NO$: C, 48.9%; H, 2.4%; F, 38.6%; N, 4.7%. Found: C, 49.0%; H, 2.6%; F, 38.6%; N, 4.7%.

The rhomboid product, melting at 160–162° C., was twice more recrystallized from n-hexane, after which the purified rhomboid crystalline product melting at 162–163° C. was characterized as 1,1,2,2,3,3-hexafluoro-6,8-bis[α(2,2,3,3,4,4 - hexafluoro - 1 - hydroxycyclobutyl)-benzyl]-5,7,9-oxadiazaspiro[3.5]nona-6,8-diene, i.e., the monospiro product.

*Analysis.*—Calcd. for $C_{28}H_{14}F_{18}N_2O_3$: C, 43.3%; H, 1.8%; F, 44.5%; N, 3.6%. Found: C, 43.1%; H, 1.7%; F, 44.3%; N, 3.8%.

The present invention is generic to polyfluoromonospiro-1,3,5,2H-oxadiazines and polyfluorodispiro-1,3,5,2H,4H-dioxazines in which, respectively, the 2-carbon of the oxadiazine ring and the 2- and 4-carbons of the dioxazine ring are the spiro carbons and wherein, again respectively, the second ring and the second and third rings of the molecular structure linked in spiro fashion through these carbons to the 1,3,5,2H-oxadiazine and 1,3,5,2H,4H-dioxazine nuclei are four-membered dihalotetrafluorocyclobutane rings and, again respectively, the 4- and 6-carbons of the oxadiazines and the 6-carbon of the dioxazines carry as substituents, if any, monovalent organic radicals free of aliphatic unsaturation, preferably also free of Zerewitinoff active hydrogen, and most preferably solely such hydrocarbon radicals of no more than about eight carbons each. The two halogen substituents present in each cyclobutane ring, in addition to the required four fluorine substituents in said ring, can be fluorine, chlorine, or bromine, alike or different, preferably the first two, and most especially both fluorines.

The present invention is likewise generic to the preparation of these polyfluoromonospiro-1,3,5,2H-oxadiazines and polyfluorodispiro-1,3,5,2H,4H-dioxazines by the direct cycloaddition reaction between, respectively, one and two molar proportions of the requisite 2,2-dihalo-3,3,4,4-tetrafluorocyclobutanone and, again respectively, two and one molar proportions of the requisite nitrile. The substituents, if any, in the resulting monospirooxadiazines and dispirodioxazines, i.e., those on the 4- and 6-carbons in the case of the monospiro-1,3,5,2H-oxadiazines and that on the 6-carbon in the case of the dispiro-1,3,5,2H,4H, dioxazines, are the monovalent radicals which together with the nitrile group form the entire molecular structure of the nitrile reactant. Thus, the 2,2-dihalo-3,3,4,4-tetrafluorocyclobutanone reactants furnish the ring oxygen and the 2-carbon of the monospiro-1,3,5,2H-oxadiazines and the two ring oxygens and the 2- and 4-ring carbons of the 1,3,5,2H,4H-dioxazines. Correspondingly, the nitrile reactants furnish the two ring nitrogens and the 4- and 6-carbons of the 1,3,5,2H-oxadiazines and the ring nitrogen and the 6-carbon of the 1,3,5,2H,4H-dioxazines. The dihalotetrafluorotrimethylene bridges forming the spirocyclobutane structures are those from the 2,2-dihalo-3,3,4,4-tetrafluorocyclobutanone.

Overall, the reaction may be regarded as a cycloaddition reaction of three reactants, i.e., in the case of the monospiro compounds of one molar proportion of the polyfluoroperhalocyclobutanone and two molar proportions of the nitrile, and in the case of the dispiro compounds of two molar proportions of the polyfluoroperhalocyclobutanone and one molar proportion of the nitrile. Accordingly, the reaction is basically a mixed cyclotrimerization reaction between dihalotetrafluorocyclobutanones and nitriles. It is emphasized that the reaction is quite specific. Thus, there are obtained none of the homocyclotrimers of the ketone, i.e., trispiro-1,3,5-trioxanes, and none of the homocyclotrimers of the nitriles, i.e., 1,3,5-triazines.

The reaction is a simple one and requires no complicated operating procedures or equipment. Generally the reaction is carried out in sealed reactors, of which the most convenient are glass or glass-lined reactors. Because of the relatively low boiling nature of some of the 2,2-dihalo-3,3,4,4-tetrafluorocyclobutanones and likewise because of the extreme chemical reactivity of these compounds, e.g., with, for instance, water, the reaction will generally be carried out by cooling the reactor to liquid nitrogen temperatures or at least to those of solid carbon dioxide (about $-80°$ C.), charging the particular 2,2-dihalo-3,3,4,4-tetrafluorocyclobutanone involved as well as the carbonitrile coreactant, purging the reaction vessel with nitrogen, sealing, and allowing the reactor to warm slowly to room temperature. With the higher boiling ketones sealed systems are not normally used. The reaction will simply be carried out at the reflux under anhydrous conditions.

The cycloaddition reaction is effected thermally. Depending on the relative reactivity of the cyclobutanones and carbonitriles, the necessary reaction temperatures and reaction times will vary. Generally, temperatures of at least about 75–80° C. are required for reaction times of from about 50 to 250 hours. Higher temperatures can be readily used, in which case, as is usual, reaction times needed will be shorter. Temperatures in the range 150–250° C. are effective, under which conditions reaction times required will be only a few hours. In the sealed systems the reaction will be effected at elevated pressures. No externally applied pressure is required. The simple autogenous pressure of the reactants under the temperature conditions used will suffice. Generally speaking, the yields and conversions are higher and the reaction times shorter with the aryl and alkaryl nitriles. The alkyl and aralkyl nitriles require longer reaction times and/or higher reaction temperatures to afford equivalent yields and conversions. It is believed these considerations arise from steric factors.

The reaction mixtures are worked up quite simply to obtain the desired polyfluorospirooxadiazines and polyfluorodispirodioxazines. Thus, at the completion of the reaction, it is only necessary to open the reactor to the atmosphere, distill away any unreacted dihalotetrafluorocyclobutanone and/or nitrile, and isolate and purify the desired products by distillation. The polyfluoromono- and dispirooxadiazines and dioxazines, being stable materials both chemically and physically, can be distilled directly with no special equipment requirements. As the molecular weight of any substituents on the 4- and 6- or 6-carbons increases as well as when the atomic weight of the halogen on the $\alpha$-carbons of the $\alpha,\alpha$-dihalo-$\gamma,\gamma$-tetrafluoro-$\alpha,\gamma$-trimethylene substituents increases, so too does the boiling point of the polyfluoro monospirooxadiazine and dispirodioxazine products. As the substituents in the 4- and 6- or 6-positions reach their maximum carbon content of generally no greater than eight carbons in each such radical, and as the $\alpha$-halogen in the $\alpha,\alpha$-dihalo-$\beta,\beta,\gamma,\gamma$-tetrafluorotrimethylene groups forming the spirocyclobutane rings both increase above an atomic number of 17, i.e., are chlorine and/or bromine, the products tend to become solids at room temperature. In most instances the dispiro products will be lower boiling and lower melting than the corresponding monospiro products.

The reaction can be effected properly in the presence or absence of an inert organic reaction medium, which, if present should be anhydrous. Any inert liquid organic diluent can be used and, generally speaking, the most common are the normally liquid hydrocarbons and polyfluorohydrocarbons, including aliphatic and aromatic compounds, such as the hexanes, heptanes, octanes, and the like; benzene, toluene, the xylenes, and the like; cycloaliphatic hydrocarbon solvents, such as cyclohexane, and the like; the polyfluoroaliphatic hydrocarbons, e.g., 1,1,2,2-tetrafluoro-3,3-dimethylbutane and the like; the polyfluoroaliphatic/cycloaliphatic hydrocarbons, e.g., perfluorodimethylcyclohexane and the like. The choice of the particular diluent, if used, is not at all critical and will vary with such other normal variables as the reaction temperature found necessary to effect reaction. In most instances, in order to simplify the reaction, no diluent is used. The requisite 2,2-dihalo-3,3,4,4-tetrafluorocyclobutanone and nitrile coreactants are simply mixed as described previously and the product isolated therefrom by distillation after the reaction has been completed. The absence of a diluent generally makes separation of unreacted material and the desired products easier.

Mixtures of both the ketones and nitriles can be used. In the case of the former, the use of mixtures will result in the formation of mixed monospiro compounds, and in the case of the dispiro compounds, mixed dispiro compounds and single dispiro compounds containing in the same molecule different spirocyclobutane structures. In the case of the use of mixtures of the nitriles, there will be obtained for the monospiro products compounds containing mixed substituents on the 4- and 6-carbons of the oxadiazines, and in the case of the dispiro compounds, mixed compounds with different substituents on the 6-carbons of the dioxazines. In all instances use of mixed reactants will likewise result in the formation of mixtures of the compounds containing only one of the mixed reactants substituents. Because of inherent difficulties in separating such mixtures, it is generally preferred to use only one polyfluoroperhalocyclobutanone and only one nitrile at any one time.

From the foregoing it is apparent that, in preparing these new polyfluoromonospiro-1,3,5,2H-oxadiazines and dispiro-1,3,5,2H,4H-dioxazines, there can be used any 2,2-dihalo-3,3,4,4-tetrafluorocyclobutanone wherein the two halogen substituents are of atomic number from 9 to 35, inclusive, i.e., fluorine, chlorine, and bromine, alike or different. More specifically, there can be used perfluorocyclobutanone, 2-chloro - 2,3,3,4,4 - pentafluorocyclobutanone, 2 - bromo - 2,3,3,4,4 - pentafluorocyclobutanone, 2 - bromo - 2 - chloro - 3,3,4,4 - tetrafluorocyclobutanone, 2,2 - dichloro - 3,3,4,4 - tetrafluorocyclobutanone, and 2,2 - dibromo - 3,3,4,4 - tetrafluorocyclobutanone.

Of these polyfluorocyclobutanones, the various chlorofluorocyclobutanones have been disclosed in U.S. Patents 2,712,554 and -5, although no detailed method for the preparation thereof is given. Perfluorocyclobutanone is a new compound per se and is being claimed in the copending application of England, Serial No. 757,701, filed August 28, 1958, a continuation-in-part of England application Serial No. 717,805, filed February 27, 1958, and referred to above. All of these polyfluoroperhalocyclobutanones can be readily prepared by the cycloaddition reaction between perfluorovinyl hydrocarbyl ethers with the requisite 1,1-dihalo-2,2-difluoroethylenes followed by hydrolysis of the resultant 1-hydrocarbyloxy- 1,3,3,4,4-pentafluoro - 2,2 - dihalocyclobutanes, all as disclosed and claimed in detail in the above-referred to copending application of England, Serial No. 717,805. These cyclobutanones are generically gaseous to liquid, depending on the total molecular weight which varies with the halogens, quite reactive materials which should preferably be handled under anhydrous conditions.

As the cycloaddition coreactant with the just-described 2,2 - dihalo - 3,3,4,4 - tetrafluorocyclobutanones there can be used any nitrile which is free of aliphatic unsaturation, i.e., is aliphatically saturated, including HCN itself. Nonreactive substituents are likewise permitted, generally best characterized as substituent functions free of Zerewitinoff active hydrogen and nonreactive with active oxo-carbonyl functions. Suitable illustrations of this type of permitted substituent include halogens bonded to carbon with the exception of polyfluoro substituents, alkoxy and nitro substituents, particularly in those structures wherein the substituents are bonded to aromatic ring carbon. For reasons of both readier availability and greater efficiency in the cycloaddition reaction with the polyfluoroperhalocyclobutanones, the preferred nitrile coreactants are mononitriles which, other than the single nitrile group, are solely hydrocarbon free of aliphatic unsaturation, i.e., aliphatically saturated, and of no more than about eight carbons exclusive of the nitrile carbon. Generically, the nitrile coreactants are inclusive of alkyl, aryl, aralkyl, alkaryl, and cycloalkyl nitriles, including those carrying the permitted nonreactive substituents. Suitable specific illustrations of useful nitrile coreactants within the genus just defined include: aliphatic nitriles such as pelargononitrile, butyronitrile, and the like; aromatic nitriles such as 4-bromo-2-naphthonitrile, p-nitrobenzonitrile, and the like; alkaromatic nitriles such as p-tolunitrile, p-ethylbenzonitrile, and the like; araliphatic nitriles such as β-phenylpropionitrile, γ-(p-methoxyphenyl)butyronitrile, and the like; cycloaliphatic carbonitriles such as cyclopentanecarbonitrile, cyclobutanecarbonitrile, and the like.

While mixtures of the monospirooxadiazines and dispirodioxazines are very probably obtained in most if not all the reactions between the aforesaid described 2,2-dihalo - 3,3,4,4 - tetrafluorocyclobutanone and various classes and types of nitriles, one or the other type product will be greatly favored with any given pair of ketone and nitrile reactants. As is true in most chemical reactions, the stoichiometry has some effect. Thus, by using excesses of the nitriles, the formation of the monospiro products, i.e., the oxadiazines, will be favored. Conversely, by using excesses of the polyfluoroperhalocyclobutanones, the proportions of the dispirodioxazines in the product will similarly be favored.

Thus, when Example I was repeated varying in that 11 parts of benzonitrile and 39 parts (two molar proportions based on the nitrile) of perfluorocyclobutanone were used and reaction was carried out for 80 hours at steam bath temperatures, 4.8 parts of benzonitrile and 18 parts of the perfluorocyclobutanone were recovered. There was obtained from the residue of the reaction mixture after such recovery 1.3 parts (3.2% conversion and 5.6% yield based on nitrile) of the monospiro product, 1,1,2,2,3,3-hexafluoro-6,8-diphenyl - 5,7,9 - oxadiazaspiro [3.5]nona-6.8-diene, as white crystals melting at 184–185° C. and 23.7 parts (48.5% conversion and 86.0% yield based on nitrile) of the dispiro product, i.e., 2,4-bis(α,γ-hexafluorotrimethylene) -6- phenyl - 1,3,5,2H,4H-dioxazine, as a clear, colorless liquid boiling at 108° C. under a pressure corresponding to 10 mm. of mercury; $n_D^{25}$, 1.4165. Thus, when the ketone reactant is charged in 2.0 molar proportions based on the nitrile, the amount of the monospiro product obtained is cut substantially to one third and the amount of dispiro product obtained is increased by substantially one quarter over the amounts of the same products respectively obtained when the ketone reactant is charged in equimolar proportions based on the nitrile.

Another, possibly the major, controlling factor in which product is largely favored from any given pair of polyfluoroperhalocyclobutanone and nitrile reactant is the relative chemical reactivity of the polyfluoroperhalocyclobutanone. Of these polyfluoroperhalocyclobutanones, by far the most chemically reactive is perfluorocyclobutanone. With this ketone, in most instances the product largely favored will be the dispirodioxazine. Only in those instances where steric effects and reactivity of the nitrile coreactant are more controlling will be monospiroxadiazine products be obtained from the perfluorocyclobutanone. Thus, with perfluorocyclobutanone and simple relatively short chain nitriles, the product almost exclusively obtained will be the dispirodioxazines. As the size or bulk of the nitrile molecule increases with the perfluorocyclobutanone reactant, increasing quantities of the monospiro product will be obtained. With the chemically less reactive polyfluoroperhalocyclobutanones wherein the halogens on the 2-carbon are, variously, bromine and chlorine, the products will consist of relatively larger proportions of the monospirooxadiazines. In fact, with the monochloro- and monobromopentafluorocyclobutanones with all but the simplest aliphatic nitriles, the products obtained will largely be the monospirooxadiazine structure. With the least reactive perfluoropolyhalocyclobutanones, i.e., the 2,2 - dichloro-3,3,4,4-tetrafluorocyclobutanone, the product with substantially all classes of nitriles of preference will be the monospirooxadiazine.

While in the foregoing the monospirooxadiazine and dispirodioxazine products have been found to form, variously, as a function of the reactivity of the polyfluoroperhalocyclobutanone reactant and the steric structure of the nitrile coreactant, as well as the respective molar proportions charged of the ketone and nitrile coreactants, still another factor enters into the nature of the products obtained. The oxadiazine and dioxazine products just discussed have been generically 1:2 and 2:1 polyfluoroperhalocyclobutanone:nitrile coreactant products, i.e., the final products have contained, respectively, one polyfluoroperhalocyclobutanone moiety and two nitrile coreactant moieties or two polyfluoroperhalocyclobutanone moieties and one nitrile coreactant moiety. Depending on the relative reactivity of the nitrile coreactant moiety as it appears in the final product, still another type product will be obtained. Thus, in those instances where the α-hydrogen or α-hydrogens on the α-carbon atom of the nitrile coreactant are chemically reactive hydrogens and also depending on the specific chemical reactivity of the polyfluoroperhalocyclobutanone, other type products will be obtained as illustrated in Examples III and VI. Thus, as in Example VI, wherein the nitrile is phenylacetonitrile, which has a fairly chemically-reactive α-hydrogen in combination with perfluorocyclobutanone, the chemically most reactive of the polyfluoroperhalocyclobutanone coreactants, the first product obtained is one involving addition of the active hydrogen across the ketone carbonyl and, as pointed out in Example VI, is neither an oxadiazine nor a dioxazine and forms no part of the present invention.

In addition to the product of the immediately-preceding paragraph and as illustrated in Example VI, the phenylacetonitrile does, in fact, form an oxadiazine of the present invention with two benzyl radicals, i.e., the moieties of phenylacetonitrile, pendent off the original nitrile carbons in the 6- and 8-positions. Because of the activating influence of the phenyl radicals on these two methylene carbons, the α-hydrogen on each of said carbons is chemically reactive and is sufficiently reactive so that each one reacts with another molecule of the perfluorocyclobutanone forming an α-(1-hydroxyperfluorocyclobutyl)benzyl radical in each of the 6- and 8-positions, i.e., a 1-hydroxycyclobutylphenylmethyl radical. Thus, the final product in this instance, while still an oxadiazine, is one in which the substituents on the 6- and 8-carbons do contain Zerewitinoff active hydrogens (the hydrogens of the hydroxyl groups), and the overall product is one wherein three molecules of the polyfluoroperhalocyclobutanone are combined with two molecules of the nitrile.

The foregoing discussion applies in the case of other nitrile coreactants wherein the α-hydrogens are chemically reactive, for example, with propionitrile as in the case of Example III. In both these instances, and in others like them, it is to be emphasized that the nitrile coreactants having a chemically-reactive α-hydrogen, result in the formation of oxadiazines or dioxazines of the present invention in which the substituents on the 6- or the 6- and 8-carbons contain Zerewitinoff active hydrogen arising from the hydroxyl group formed by addition of the chemically-reactive hydrogen across the ketone carbonyl.

Using the cycloaddition reaction conditions outlined in the foregoing, there will be obtained from the specific polyfluoroperhalocyclobutanone and nitrile coreactants, just discussed generically and illustrated with suitable specific examples, additional monospirooxadiazines and dispirodioxazines of the present invention. More specifically, from perfluorocyclobutanone and pelargononitrile there will be obtained 2,6-bis(α,γ-hexafluorotrimethylene)-4-n-octyl-1,3,5,2H,4H - dioxazine. From n-hexanenitrile and 2,2-dichloro-3,3,4,4-tetrafluorocyclobutanone there will be obtained 1,1,2,2,3,3-hexafluoro - 6,8 - di - n-pentyl-5,7,9-oxadiazaspiro[3.5]nona-6,8-diene. From 2-chloro-2,3,3,4,4-pentafluorocyclobutanone and 4-bromo-2-naphthonitrile there will be obtained 1-chloro-1,2,2,3,3-pentafluoro-6,8-(4-bromo - 2 - naphthyl)-5,7,9-oxadiazaspiro[3.5]nona - 6,8 - diene. From perfluorocyclobutanone and γ-nitrobutyronitrile there will be obtained 2,6-bis(α,γ-hexafluorotrimethylene) - 4 - (γ - nitropropyl)-1,3,5,2H,4H-dioxazine. From 2,2-dichloro-3,3,4,4-tetrafluorocyclobutanone and tolunitrile there will be obtained 1,1 - dichloro-2,2,3,3 - tetrafluoro - 6,8 - di-p-tolyl-5,7,9-oxadiazaspiro[3.5]nona-6,8-diene. From perfluorocyclobutanone and p-ethylbenzonitrile there will be obtained 2,2,3,3,4,4-hexafluorocyclobutane-1-spiro-2'-4'-(p - ethylphenyl)-1',3',5',2'H,4'H-dioxazine - 6' - spiro-1''-2'',2'',-3'',3'',4'',4''-hexafluorocyclobutane. From β-phenylpropionitrile and 2,2 - dibromo-3,3,4,4-tetrafluorocyclobutanone there will be obtained 2,6-bis(α,α,-dibromo-β,β,γ,γ-tetrafluorotrimethylene)-4-(β - phenylethyl)-1,3,5,2H,4H-dioxazine. From perfluorocyclobutanone and β-(p-nitrophenyl)propionitrile there will be obtained 2,6-bis(α,γ-hexafluorotrimethylene) - 4 - [β-(p-nitrophenyl)ethyl]-1,3,5,2H,4H - dioxazine. From cyclohexanecarbonitrile and 2-bromo-2-chloro - 3,3,4,4 - tetrafluorocyclobutanone there will be obtained 2,6-bis(α-bromo-α-chloro-β,β,γ,γ-tetrafluorotrimethylene) - 4 - cyclohexyl-1,3,5,2H,4H-dioxazine. From hydrogen cyanide and 2,2-dichloro-3,3,4-tetrafluorocyclobutanone there will be obtained 1,1-dichloro - 2,2,3,3-tetrafluoro-5,7,9-oxadiazaspiro[3.5]nona-6,8-diene.

These new polyfluorooxadiazaspirononadienes, i.e., the monospirooxadiazines, and polyfluorodispirodioxazines are generically chemically and physically stable compounds ranging from liquids to low-to-high melting solids, depending on the molecular weight of the substituents on the 4- and 6-carbons, if any, of the oxadiazine ring in the monospiro compound and the substituent on the 6-carbon of the dioxazine ring in the case of the dispiro compounds, as well as on the molecular weight of the halogens on the carbons of the cyclobutane rings alpha to the spiro carbon. These compounds are of use as heat transfer media for use at high temperatures and also as hydraulic power transmission fluids for use under conditions of high temperature and stress. The compounds will not support combustion and are spontaneously self-extinguishing when enflamed from an external source.

In addition to these properties, these new mono- and dispiropolyfluoroperhalocyclobutane - 1,3,5 - oxadiazines and -dioxazines are generically useful as solvents for highly-fluorinated polymers, for instance, the fluorinated olefin polymers or more precisely the polymers of polyfluorinated olefins. Solutions of such polymers, e.g., polytetrafluoroethylene, polychlorotrifluoroethylene, and the like, in these oxadiazines and dioxazines are useful in rendering waterproof and water repellent such cellulose shaped objects as paper, wood, and the like, as well as in forming films and fibers and other shaped objects of such polymers. In addition to their excellent waterproof and water repellent-rendering properties, solutions of such polymers in these oxadiazines and dioxazines are also useful in rendering cellulose shaped objects nonsupportive of combustion. More specifically:

EXAMPLE A

*Use of the Oxadiazines and Dioxazines as Solvents*

A 10% by weight solution of a low molecular weight, low-melting tetrafluoroethylene polymer (melting range, 83–150° C.) in the 4-methyl-2,6-bis(α,γ-hexafluorotrimethylene)-1,3,5,2H,4H-dioxazine of Example II was prepared by heating the polymer in the dioxazine. Strips of filter paper were immersed in the hot solution, removed, and washed with hot acetone to remove the dioxazine solvent. The thus-treated strips were then dried and on testing it was found that the treated strips were water repellent and did not support combustion. In contrast, untreated strips were rapidly and completely wet on contact with water and, furthermore, burned rapidly when exposed to a flame. The same results were obtained using the 4-ethyl-2,6-bis(α,γ-hexafluorotrimethylene)-1,3,5,2H,4H-dioxazine of Example III and the 2,4-bis(α,γ - hexafluorotrimethylene)-6-phenyl-1,3,5,2H,4H-dioxazine and the 1,1,2,2,3,3 - hexafluoro - 6,8 - diphenyl-5,7,9-oxadiazaspiro[3.5]nona-6,8-diene, i.e., the 2,4-diphenyl-1,3,5,2H-oxadiazine, 6 - spiro - 1'-2',2',3',3',4',4'-hexafluorocyclobutane of Example I.

Since obvious modifications in the invention will be evident to those skilled in the chemical arts, I propose to be bound solely by the appended claims.

The embodiments of the invention in which an exclusive property or privilege is claimed are defined as follows.

I claim:
1. A compound of the formula

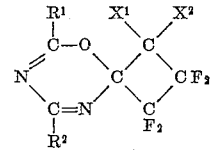

wherein (1) $X^1$ and $X^2$ are selected from the group consisting of chlorine, fluorine and bromine, and (2) $R^1$ and $R^2$ are selected from the group consisting of hydrogen and monovalent alkyl, aryl, alkaryl, aralkyl and cycloalkyl radicals free from aliphatic unsaturation and containing no more than 8 carbons each.

2. A compound of the formula

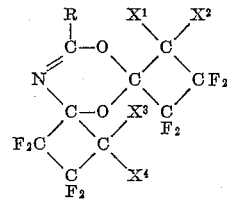

wherein (1) $X^1$, $X^2$, $X^3$ and $X^4$ are selected from the group consisting of chlorine, fluorine and bromine, and (2) R is a member of the group consisting of hydrogen and monovalent alkyl, aryl, alkaryl, aralkyl and cycloalkyl radicals free from aliphatic unsaturation and containing no more than 8 carbons each.

3. 1,1,2,2,3,3-hexafluoro - 6,8 - diphenyl - 5,7,9 - oxadiazaspiro[3.5]nona-6,8-diene, M.P. about 180° C.

4. 2,4-bis($\alpha,\gamma$-hexafluorotrimethylene) - 6 - phenyl-1,3-5,2H,4H-dioxazine, B..P. about 101° C. at 10 mm. of mercury pressure, $n_D^{25}=1.4167$.

5. 4-methyl - 2,6 - bis($\alpha,\gamma$-hexafluorotrimethylene)-1-3,5,2H,4H-dioxazine, B.P. about 92° C. at 95 mm. of mercury pressure, $n_D^{25}=1.3412$.

6. 4-ethyl - 2,6 - bis($\alpha,\gamma$-hexafluorotrimethylene)-1,3-5,2H,4H-dioxazine, B.P. about 115° C. at 178 mm. of mercury pressure, $n_D^{25}=1.3450$.

7. The process of preparing a member of the group consisting of 2,2-($\alpha,\alpha$-dihalo-$\beta,\beta,\gamma,\gamma$-tetrafluoro-$\alpha$-$\gamma$-trimethylene)-1,3,5,2H-oxadiazines and 2,2-,4,4-bis($\alpha,\alpha$-dihalo-$\beta,\beta,\gamma,\gamma$-tetrafluoro-$\alpha,\gamma$-trimethylene) - 1,3,5,2H,4H-dioxazines wherein any halogen present has an atomic number less than 36 which comprises reacting together at about 75–250° C. a 2,2-dihalo-3,3,4,4-tetrafluorocyclobutanone and a nitrile free of aliphatic unsaturation selected from the group consisting of alkyl, aryl, aralkyl, alkaryl and cycloalkyl nitriles.

8. The process of claim 7 wherein the cyclobutanone is perfluorocyclobutanone.

9. The process which comprises reacting together at about 75–250° C. perfluorocyclobutanone and benzonitrile.

10. The process which comprises reacting together at about 75–250° C. perfluorocyclobutanone and acetonitrile.

11. The process which comprises reacting together at about 75–250° C. perfluorocyclobutanone and propionitrile.

12. The process which comprises reacting together at about 75–250° C. perfluorocyclobutanone and phenylacetonitrile.

13. The process which comprises reacting together at about 75–250° C. 2-bromo-2,3,3,4,4-pentafluorocyclobutanone and benzonitrile.

14. The process which comprises reacting together at about 75–250° C. 2,2-dichloro-3,3,4,4-tetrafluorocyclobutanone and benzonitrile.

15. 1-bromo - 1,2,2,3,3 - pentafluoro-6,8-diphenyl-5,7,9-oxadiazaspiro[3.5]nona-6,8-diene.

16. 1,1-dichloro - 2,2,3,3 - tetrafluoro-6,8-diphenyl-5-7,9-oxadiazaspiro[3.5]nona-6,8-diene.

17. 1,1,2,2,3,3-hexafluoro - 6,8 - bis[$\alpha$(2,2,3,3,4,4-hexafluoro - 1 - hydroxycyclobutyl)benzyl]-5,7,9-oxadiazaspiro[3.5]nona-6,8-diene.

No references cited.